United States Patent [19]

van den Munckhof et al.

[11] Patent Number: 4,899,527
[45] Date of Patent: Feb. 13, 1990

[54] HARVESTING MACHINE

[76] Inventors: P. J. M. van den Munckhof, Lindweg 1; M. R. M. J. van den Munckhof, Westerholtstraat 51, both of Horst, Netherlands

[21] Appl. No.: 136,563

[22] Filed: Dec. 22, 1987

[30] Foreign Application Priority Data

Dec. 23, 1986 [NL] Netherlands .................. 8603284

[51] Int. Cl.$^4$ ............................................. A01D 46/00
[52] U.S. Cl. ................................. 56/328.1; 56/327.1; 414/508; 414/523; 198/318
[58] Field of Search ............................ 56/327.1, 328.1; 414/508, 523; 198/312–320

[56] References Cited

U.S. PATENT DOCUMENTS

| | | | |
|---|---|---|---|
| 1,504,846 | 8/1924 | Tarkington | 56/327.1 |
| 2,321,387 | 6/1943 | Jackson | 56/328.1 |
| 2,590,965 | 4/1952 | Huston | 56/327.1 |
| 3,981,127 | 9/1976 | Smith | 56/328.1 |
| 4,199,913 | 4/1980 | Hood et al. | 56/328.1 |

FOREIGN PATENT DOCUMENTS 2537828 6/1984 France .................. 56/328.1

Primary Examiner—John Weiss
Attorney, Agent, or Firm—Watson, Cole, Grindle & Watson

[57] ABSTRACT

A horizontal boom extends laterally from a superstructure and includes a boom belt conveyor which receives harvested fruit from upwardly extending belt conveyors. The boom conveyor carries fruit to an inner discharge end above the superstructure for discharge into a vertical passage and then into a container at the bottom of the passage. A downwardly moving vertical conveyor forms one side of the passage and has rows of deformable fingers which lower fruit into the container. A sheet forming the opposite side of the passageway moves the entire vertical conveyor upwardly in response to accumulation of fruit within the container, while the vertical conveyor continuously moves in a downwardly conveying direction to carry fruit to the container.

16 Claims, 8 Drawing Sheets

HARVESTING MACHINE

The current invention relates to a harvesting machine for harvesting fruit, for instance apples, and other vulnerable produce, comprising:
(a) a vehicle
(b) a carriage placed on the vehicle for a holder intended for harvested fruit,
(c) a vehicle superstructure carried by the vehicle,
(d) at least one harvesting boom extending sideways from a side of the vehicle superstructure over the plants bearing the fruit,
(e) transporting means for conveying the harvested fruit along the harvesting boom into the holder.

Such a harvesting machine is suitable for harvesting fruit, the plants of which are planted bed-wise. This implies that one or more rows of plants are separated from one another by passage-ways, a number of which are in each case separated by a path over which the harvesting machine moves. The harvesting boom extends from the path over the plants to passageways located further away and has a considerable length. Since the plants are usually up to about 2-3 meters in height, it will be apparent that exceptional construction requirements are demanded with respect to the manner in which the harvesting boom is coupled to the vehicle. The harvesting machine must not for instance become top-heavy and a surface must furthermore be left free above the carriage such that the fruit is set down in a controlled manner from the harvesting boom into the box without damage to the fruit being caused.

A known harvesting machine is provided with a harvesting boom which extends transversely over the vehicle superstructure. Using a counterweight tipping over of the harvesting machine in the direction of the harvesting boom is counteracted owing to the construction whereby the vehicle boom is attached onto the vehicle superstructure. Furthermore, the harvesting capacity of this known harvesting machine is limited.

The invention has for its object to provide a harvesting machine of the type referred to in the preamble, the harvesting capacity of which is enlarged. Through use of a second harvesting boom which can have a considerably lower weight than a counterweight, the total harvesting machine becomes lighter and better maneuverable. Via both harvesting booms harvested fruit is now supplied from directions parallel to and opposing each other. This supplied fruit can only maximally be discharged rapidly and in the correct manner into the holder, whereby as small a surface as possible is occupied, if both the holder conveyors are disposed eccentrically relative to an axis of rotation located vertically between them of the carriage which is arranged on the vehicle for rotation round this axis of rotation.

If the harvesting boooms are provided with tilting means which co-operate with tilting supports attached to the vehicle superstructure, the position of each harvesting boom can be adapted to the height of the plants.

As much space as possible must remain free above the holder for the holder conveyors, their driving means and the driving means for the main conveyors. If however the largest possible capacity of the holder conveyors has to be ensured, it is recommended that the harvesting booms end before the respective main conveyors so that the latter may remain as wide as possible. In these circumstances it is possible that the harvesting boom extends past the tilting supports or that the tilting means and the tilting supports are disposed and arranged such that an axis of tilt coincides with an axis of rotation of a roller of the main conveyor situated near the holder conveyor. In this latter case substantially no displacement will occur during a tilting movement between on the one hand the main conveyors and on the other their holder conveyor.

In order to keep the harvesting boom in its substantially lying position while the discharge surface remains free to the maximum extent, it is recommended that the tensile forces are diverted over the boom so that the harvesting boom is preferably coupled via tensioning members to fastening members attached to the other side of the vehicle superstructure. The lying position of the harvesting boom can be adapted to irregular terrain if the fastening members preferably consist of cranks attached to a shaft fastened for rotation to the vehicle superstructure.

If in preference the main conveyor extends above the carriage and connects onto a downward discharging holder conveyor, a smooth and fluid transition from main conveyor to holder conveyor is realized which substantially avoids damage to the fruit. It is particularly recommended that the holder conveyor is guided reciprocally on the vehicle superstructure relative to the carriage.

In order to obtain a maximum of maneuverability and versatility of the harvesting machine while harvesting is performed rapidly and adequately in the passage-ways, it is recommended that the booster conveyor is guided releasably and for sliding on the harvesting boom.

A light harvesting boom that is also torsion-free and cheap to construct is obtained if in preference the harvesting boom comprises a box frame over which and through which a conveyor belt of the main conveyor is guided.

If in preference the width of the box frame decreases in the direction of an upper part of the conveyor belt and a discharge point of the booster conveyor extends above a box frame bottom, falling of the fruit over a certain height during the transition from the booster conveyor to the main conveyor is avoided as much as possible, so that damage to the fruit is prevented to a very considerable extent.

The maneuvering between the paths is greatly improved if in preference the vehicle superstructure is coupled to the vehicle via a rotary crown rotatable around a vertical axis.

If the carriage is arranged on the vehicle via a rotary table rotatable around a vertical axis, the fruit can be discharged into the holder quickly and evenly.

Rapid unloading of a filled holder and quick positioning on the carriage of a holder for filling is achieved if the vehicle is provided on sides lying transversely of wheel shafts of the vehicle with raisable roller conveyors connecting onto a roller conveyor placed on the carriage. In this way harvesting is not greatly limited as a result of the machine being at a standstill.

If operation is with only one sideways extending harvesting boom, a counterweight can be dispensed with when a free end of the harvesting boom is preferably provided with a support supporting on the ground via a wheel.

A well balanced, stable and fast operating harvesting machine is obtained according to the invention if two harvesting booms extend sideways from the vehicle superstructure in mutually opposing directions.

Mentioned and other characteristics will be elucidated on the basis of a number of embodiments of a harvesting machine according to the invention and with reference to the annexed drawing.

Figure 1:
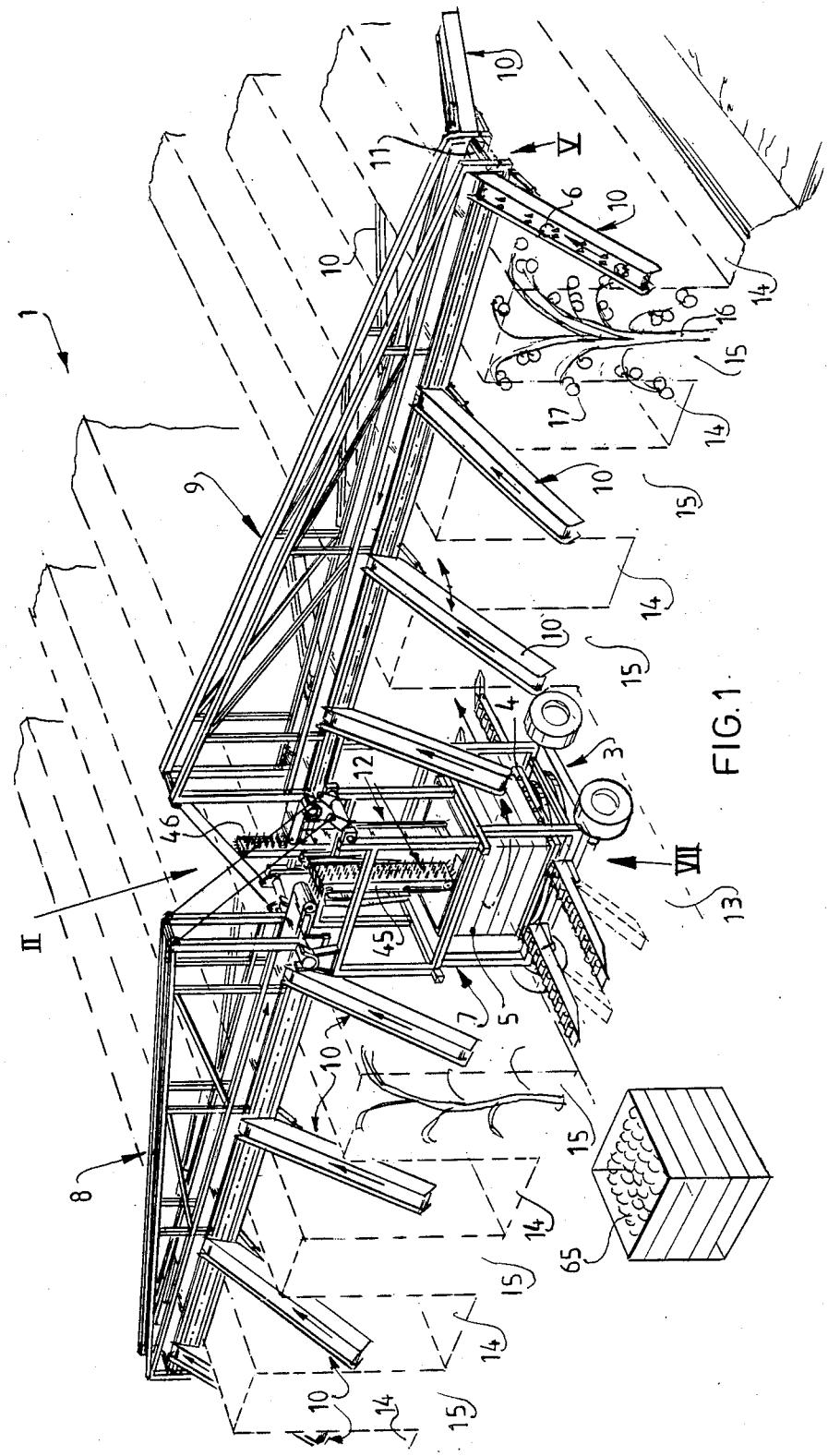
FIG. 1 is a perspective view of a harvesting machine according to the invention in operation.
Figure 2:
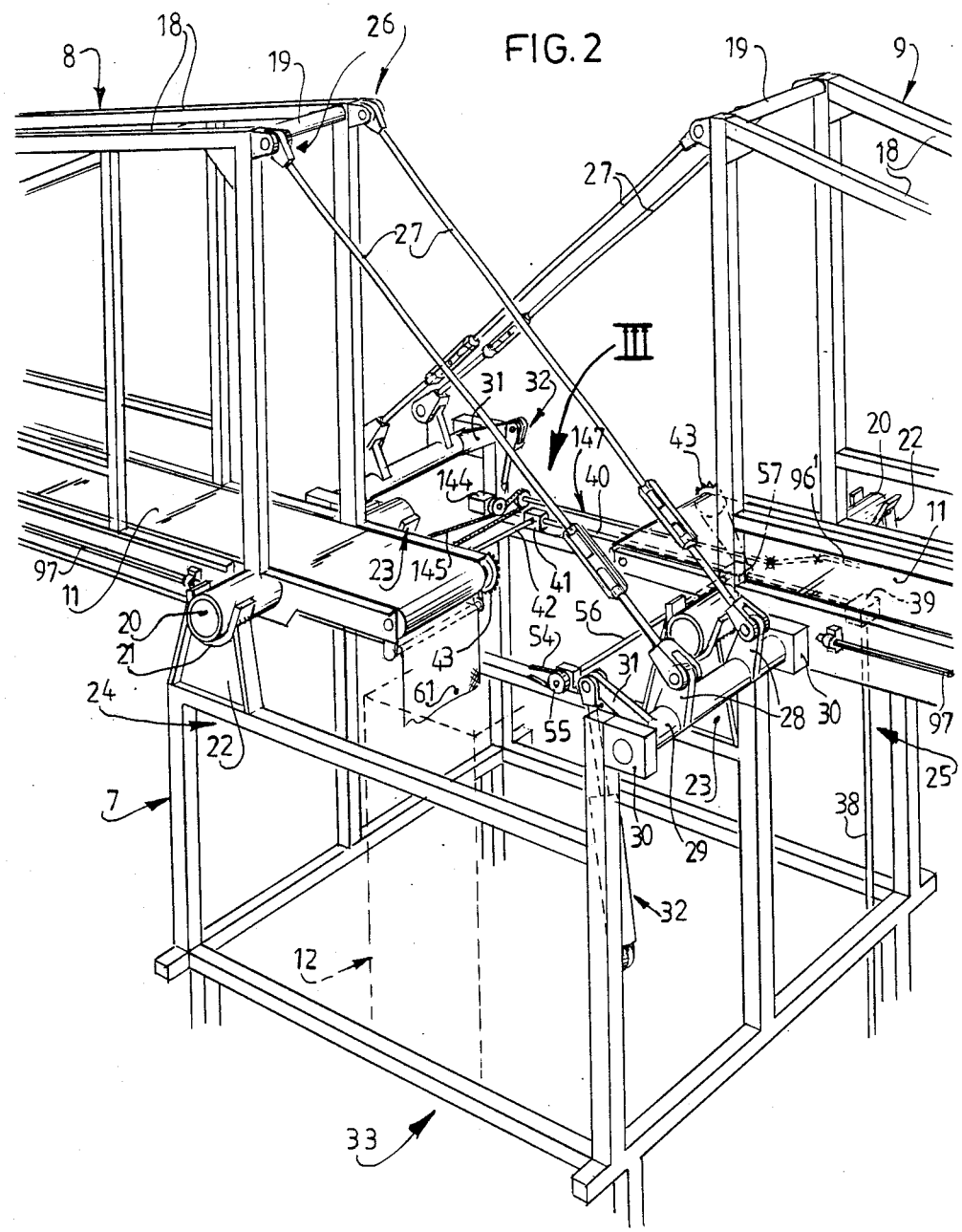
FIG. 2 is a perspective, simplified detail as according to arrow II from FIG. 1.

FIG. 1 shows a harvesting machine 1 according to the invention. Harvesting machine 1 comprises a vehicle 3, a carriage 4 placed on vehicle 3, on which carriage lies a holder 5 for harvested fruit 6, and a vehicle superstructure 7 carried by vehicle 3, on which two harvesting booms 8, 9 extending sideways in mutually opposing directions rest tiltably. Via the transporting means 10, 11, 12 the fruit drops into holder 5.

The harvesting machine 1 moves over a path 13 on either side of which stand rows 15 of fruit trees 16 separated by passage-ways 14. The fruit trees 16 bear fruit 17 for harvesting. Harvesting booms 8 and 9 extend over passage-ways 14 and a number of rows 15, while the transporting means 10 move along the rows 15 so that harvesting can be carried out where vehicle 3 cannot gain access.

Each harvesting boom 8 and 9 consists of two substantially wedge-shaped frameworks 18 joined by crosspieces 19 and by a cylindrical tube 20. The harvesting boom 8, 9 rests with this tube 20 on a curved seat 21 of a tilting support 22, 23. This latter is attached to a sidepart 24 or 25 of the vehicle superstructure 7. Each harvesting boom 8, 9 thus ends at the point of its tilting supports 22, 23. Harvesting boom 8, 9 is attached from the upper end 26 of each framework 18 to cranks 28 via tie rods 26. These cranks 28 are welded to a shaft 29 which is mounted for rotation in bearings 30 fitted on vehicle superstructure 7. Via another crank 31 connected to shaft 29 and a piston/cylinder 32 the shaft 29 is rotated and the lying position of the respective harvesting booms 8, 9 is thereby set. It will be apparent that the tie rods 27 span a harvesting plane 33 determined and enclosed by the vehicle superstructure 7, while each harvesting boom 8, 9 scarcely screens this harvesting plane 33 so that a maximum space is available for the transporting means 12 and their driving means.

Only transporting means 11 extend over the plane 33 and link up with the transporting means 12 in a manner to be described hereinafter.

Transporting means 11 comprise a main conveyor 34 which comprises a conveyor belt 37 guided round rollers 35, 36 mounted for rotation on two frameworks 18. Via the drive rod 38, the transmission 39, the drive rod 40, the transmission 41 and the drive rod 42 the roller 35 and with it conveyor belt 37 is driven via a chain 44 guided round a gear wheel 43. The conveyor belt 37 of harvesting boom 9 is driven in a similar manner (not shown).

Transporting means 12 comprise for each harvesting boom 8, 9 a holder conveyor 45, 46. Each holder conveyor 45, 46 consists of two parallel rigid plates 47, 48 in which rollers 49, 50 are mounted at an interval from each other and around which a conveyor belt 51 is fastened. Conveyor belt 51 comprises rows of deformable fingers 72 arranged in transverse direction thereof. Rollers 49, 50 are driven with a drive belt 54 fastened around reels 52, 53 respectively that are rigidly connected to the rolls. For harvesting boom 8 drive belt 54 is connected via a roll 55 and a rod 56 and a coupling 57 to the drive rod 40. The drive belt 54 of the holder conveyor 46 for harvesting boom 9 is fastened round a roll 58 rigidly connected to drive rod 42.

Plates 47, 48 are provided with elongate guide strips 59 which co-operate with angled profiles 60 welded on vehicle superstructure 7. The holder conveyors 45, 46 are reciprocating relative to carriage 4 using a sheet 61 attached to the lower end 160 of plates 47 and 48, this sheet having substantially the same width as conveyor belt 51. Sheet 61 is guided round a roller 62 and connected to a hydraulic cylinder 63. This cylinder 63 is actuated if a drag sheet 64 attached for pivoting to holder conveyor 45, 46 allows a switch 66 to make contact under the influence of fruit 65 present in holder 5. In this way the entire holder conveyor 45, 46 moves in upward direction, while a smooth transition from the conveyor belt 37 to conveyor belt 51 remains assured.

Figure 4:
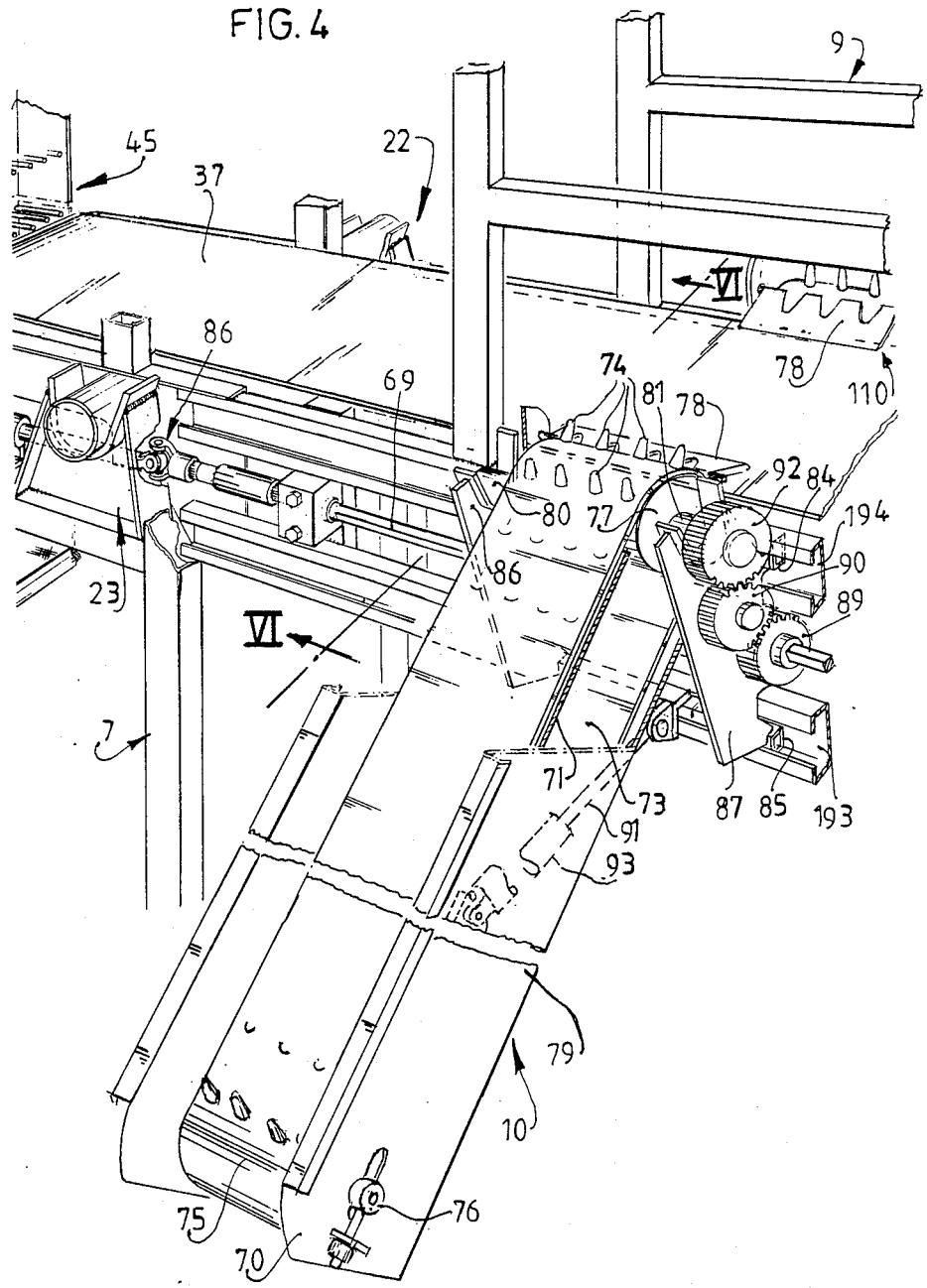
FIG. 4 shows on a different scale a detail as according to arrow IV from FIG. 1.
Figure 5:
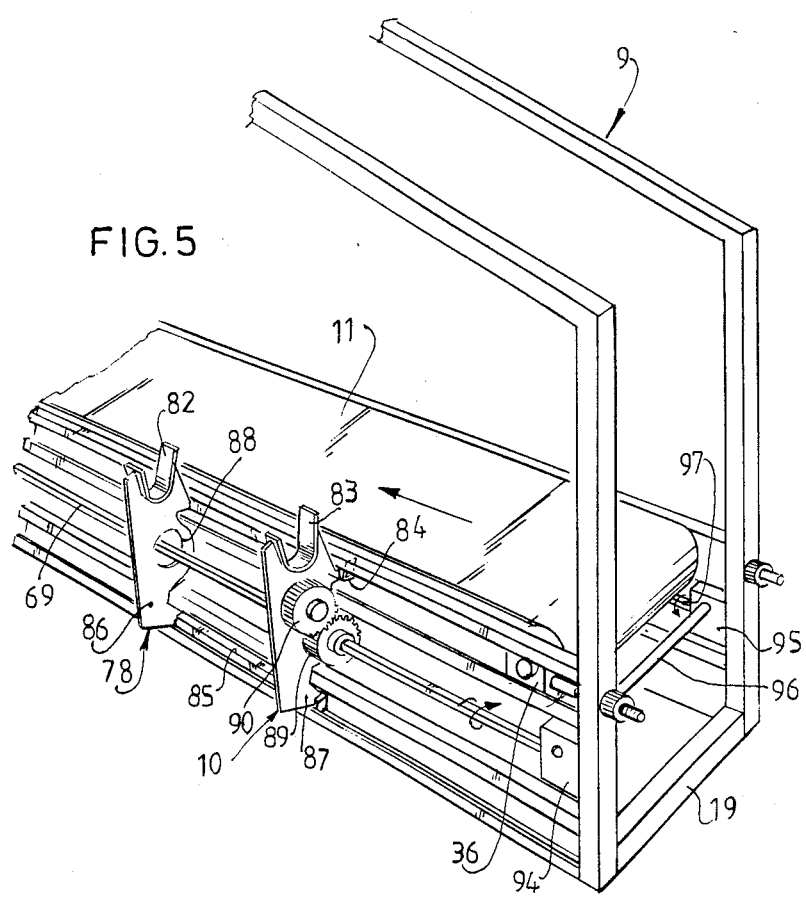
FIG. 5 shows on a larger scale a detail as according to arrow V from FIG. 1.

The use of this specific holder conveyor 45, 46 is particularly recommended because as a consequence of the tilting of harvesting boom 8, 9 a relaive displacement occurs which is compensated by the fingers 72 used. If fruit leaving conveyor belt 37 strikes the fingers 72, these will deform temporarily until the fruit can take up position between rows of fingers 72. A more or less considerable distance between belt 37 and rows of fingers 72 can hereby easily be compensated. The tilting movement is further compensated by a chain tensioner 67 which keeps chain 44 tensioned and by a cardan joint 68 for the drive rod 69 of the transporting means 10 to be discussed in detail hereinafter with reference to FIGS. 4 and 5. The lifting bar 69 is driven using a hydromotor 144. This motor 144 drives on the one hand the drive rod 69 via a chain 145 and a geaing 146 via cardan joint 68. On the other hand hydromotor drives the drive rod 69' of harvesting boom 9 via a system of rods 147.

The transporting means 10 comprise a booster conveyor 79 consisting of a chute 73 formed from a fixed plate 70 and a covering plate 71. This chute 73 is torsion rigid and may therefore have a low weight and be manufactured from thinner material, this contributing to a greater stability because the distance of a booster conveyor 79 to the tilting supports 22, 23 can be considerable.

Guided through chute 73 over cover plate 71 and around rollers 76 and 77 is a conveyor belt 75 provided with rows of fingers 74. The harvested fruit 6 rolls onto conveyor belt 37 via a gangway 110.

Roller 77 is provided with shaft end parts 80, 81 protruding outside chute 73, whereby the end part 81 is also provided with a gear wheel 92. Shaft end parts 80, 81 rest in curved seats 82, 83 of a rider 78 consisting of plates 86, 87 held at a distance from each other by rails 84, 85. Plate 86 is provided with a through-bore 80 for passage of drive rod 69. Plate 87 is provided with a gear wheel 89 arranged for rotation thereon and for sliding on the non-round rod 69, this wheel making gripping contact with a gear wheel 90. This wheel 90 is placed in is gripping contact with gear wheel 92 when the booster conveyor 79 is hooked into and rests on the seats 82, 83.

Rails 84 and 85 are guided in profiles 193 and 194 forming part of harvesting booms 8, 9. Further connected to rail 85 is a piston rod 91 of a gas spring 93, this rod being linked at the other side to conveyor 79 so that an angle of slope relative to the ground can be adjusted as required by the picker.

A non-round drive rod 97 located on the other side is driven via transmissions 94 and 95 and drive rod 96 in directions opposite those indicated with the arrows.

Figure 6:
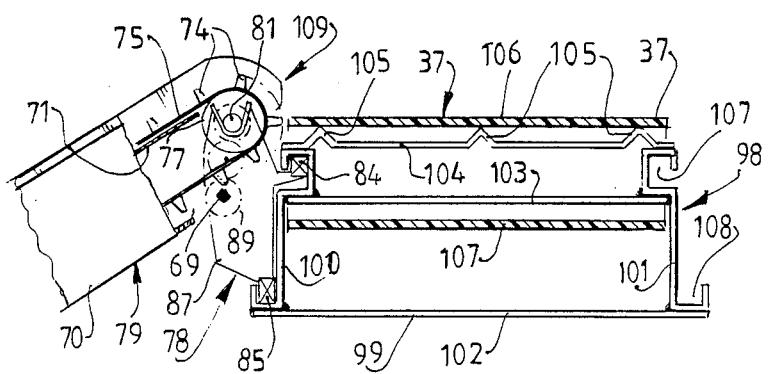
FIG. 6 is a section along the line VI—VI from FIG. 4 of another embodiment for the harvesting boom.

FIG. 6 shows a variant for the harvesting booms 8 and 9. In this case the harvesting boom 98 comprises a box frame 99 consisting of two lateral profiles 100 and 101, a box base 102, an intermediate plate 103 and a top plate 104. Top plate 104 is provided with elongate ribs 105 on which rests the upper part 106 of the conveyor belt 37. Each profile 100, 101 is formed such that it is provided with a channel 107 opening from the top downward and a lower channel 108 opening towards the top. Upper channel 107 is staggered laterally inward relative to lower channel 108 so that the width of box frame 99 is greater at the point of the lower channel 108 than the width at the point of upper channel 107. This has the consequence that a booster conveyor 79 that is releasably hooked into the rider 78 which is guided in channel 107 with the rail 84 and in the lower channel 108 with rail 85 extends with its discharge point 109 past lower chute 108 so that a gangway 110 can be dispensed with in respect of FIG. 6.

Figure 7:
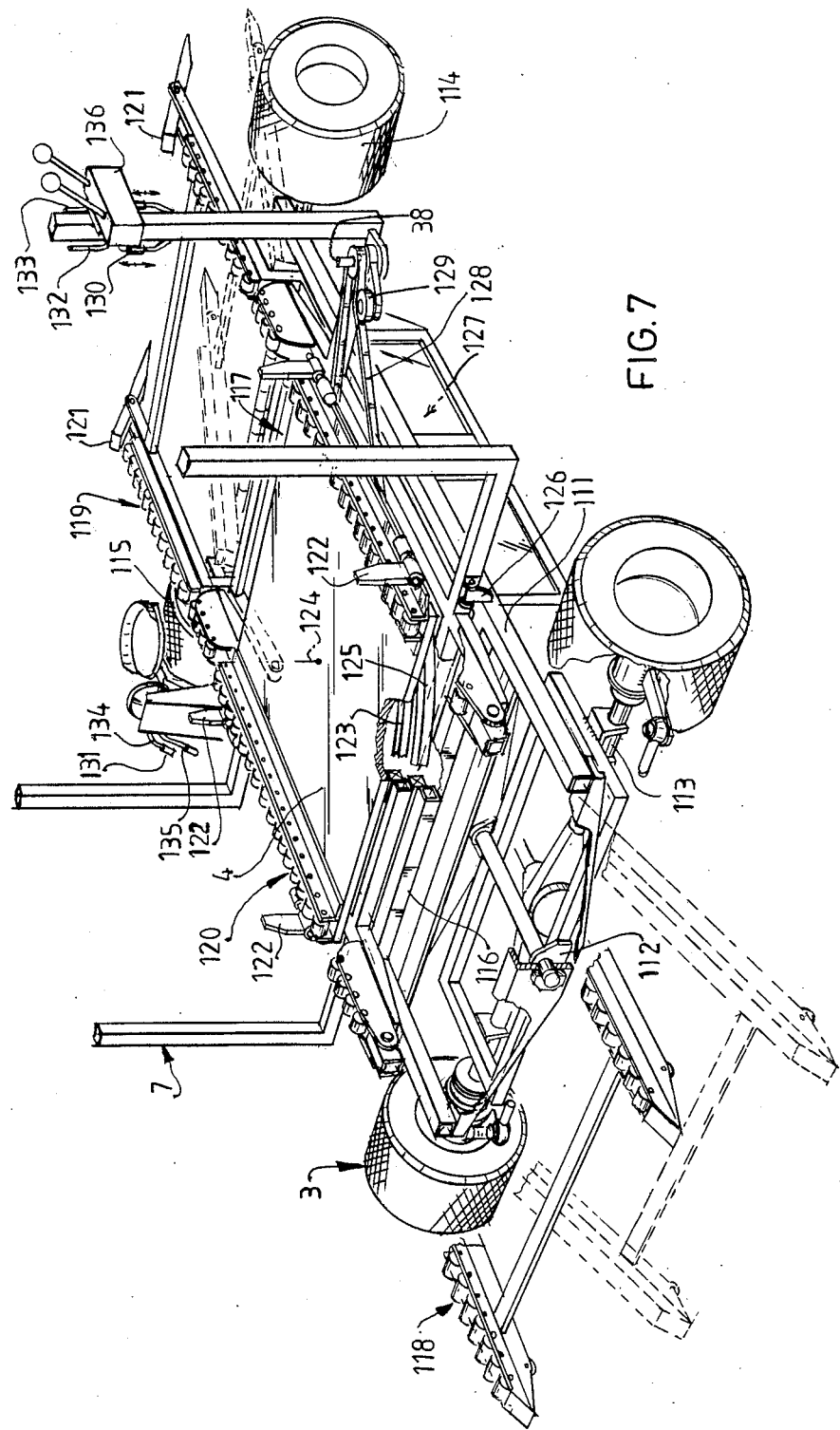
FIG. 7 shows on a larger scale detail VII from FIG. 1.

FIG. 7 shows in more detail the manner in which the vehicle superstructure 7 is placed on vehicle 3. The latter comprises a chassis 111 which supports via a reciprocal coupling 112 on the front wheel axle 113. The carriage superstructure 7 is thus supported on three points which results in a very stable construction. Chassis 111 is provided on its sides 116, 117 lying transversely of the wheel axle 113 and the wheel axle (not shown) of the rear wheels 114, 115 with raisable roller conveyors 118 and 119 respectively which connect onto a roller conveyor 120 placed on carriage 4. The roller conveyor 119 at the rear 117 of vehicle 3 is provided with stops 121 attached thereto for pivoting, up against which a holder 5 filled with fruit can run. When roller conveyor 119 is set down in the position indicated with dashed lines, stops 121 pivot into a position located in line with roller conveyor 119 so that the full holder rolls off gently onto the ground. In the meantime an empty holder can be rolled via the forward roller conveyor 119 onto roller conveyor 120. On roller conveyor 120 a holder can be fixed in place with projections 122.

The carriage 4 can be rotated via a rotary crown 123 round a vertical axis of rotation 124 relative to vehicle superstructure 7 and relative to chassis 111, while independently of this the vehicle superstructure 7 can be rotated via rotary crown 125 around the same axis of rotation relative to chassis 111 and carriage 4. A rotation of the vehicle superstructure 7 can be secured with the lock 126.

The driving of the various moving mechanical parts is carried out with hydraulic motors placed in casing 157. As well as other parts the pulley 128 is driven in this way, whereby carriage 4 can be driven for rotation on the one hand and drive rod 38 on the other. By placing the pulley 128 out of gripping contact with the tensioning roller 129 carriage 4 can be turned manually and placed in a position in which roller conveyors 118, 119 and 120 lie in one line.

Using releasable couplings 130, 131 the lines 132 and 133 of the vehicle superstructure 7 can, irrespective of the position of vehicle superstructure 7 relative to vehicle 3, be coupled with the lines 134 and 135 that are connected to the motors, so that only one control unit 136 is necessary.

Figure 3:
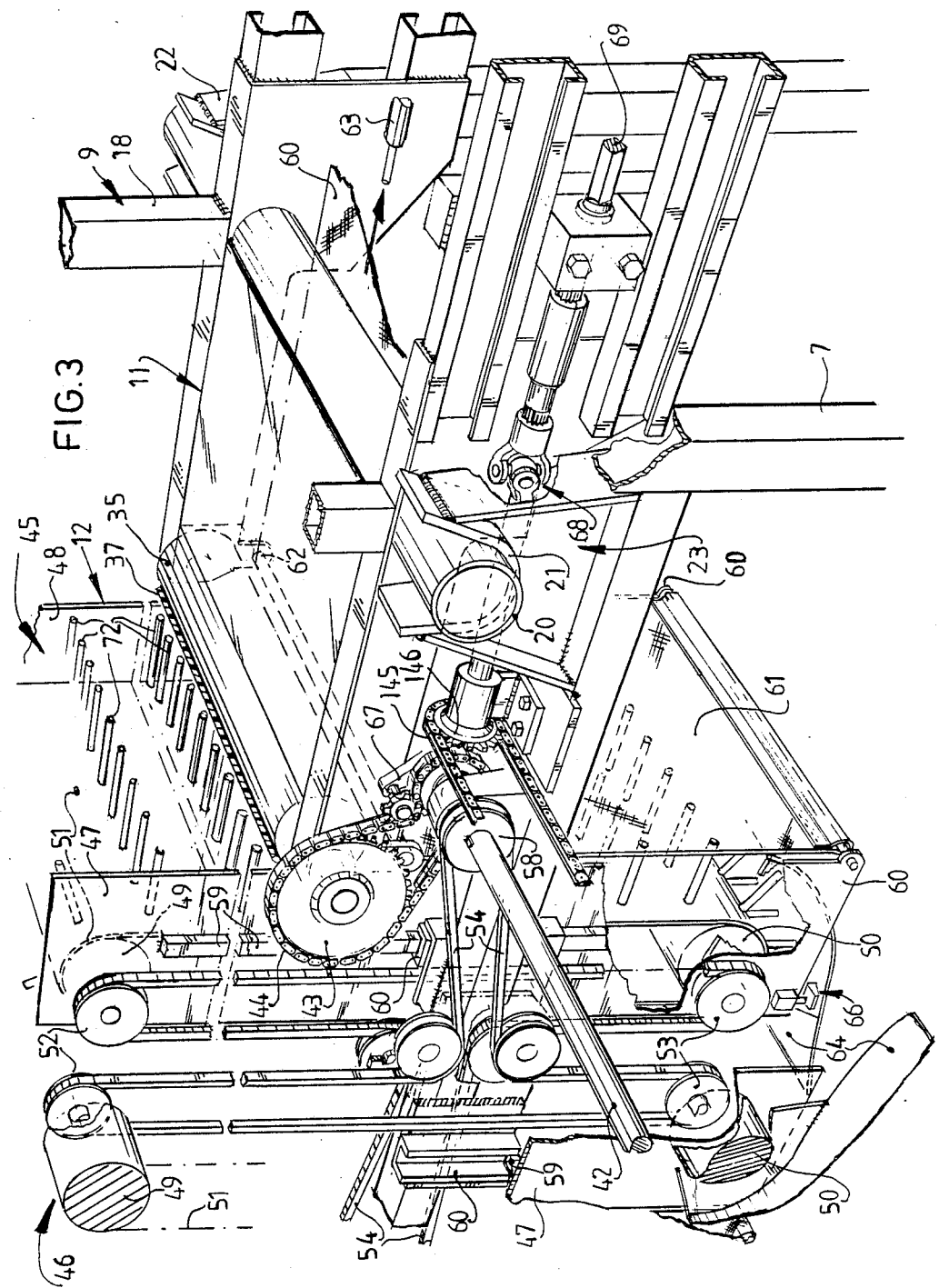
FIG. 3 shows a perspective, partly broken away detail as according to arrow III from FIG. 2.
Figure 8:
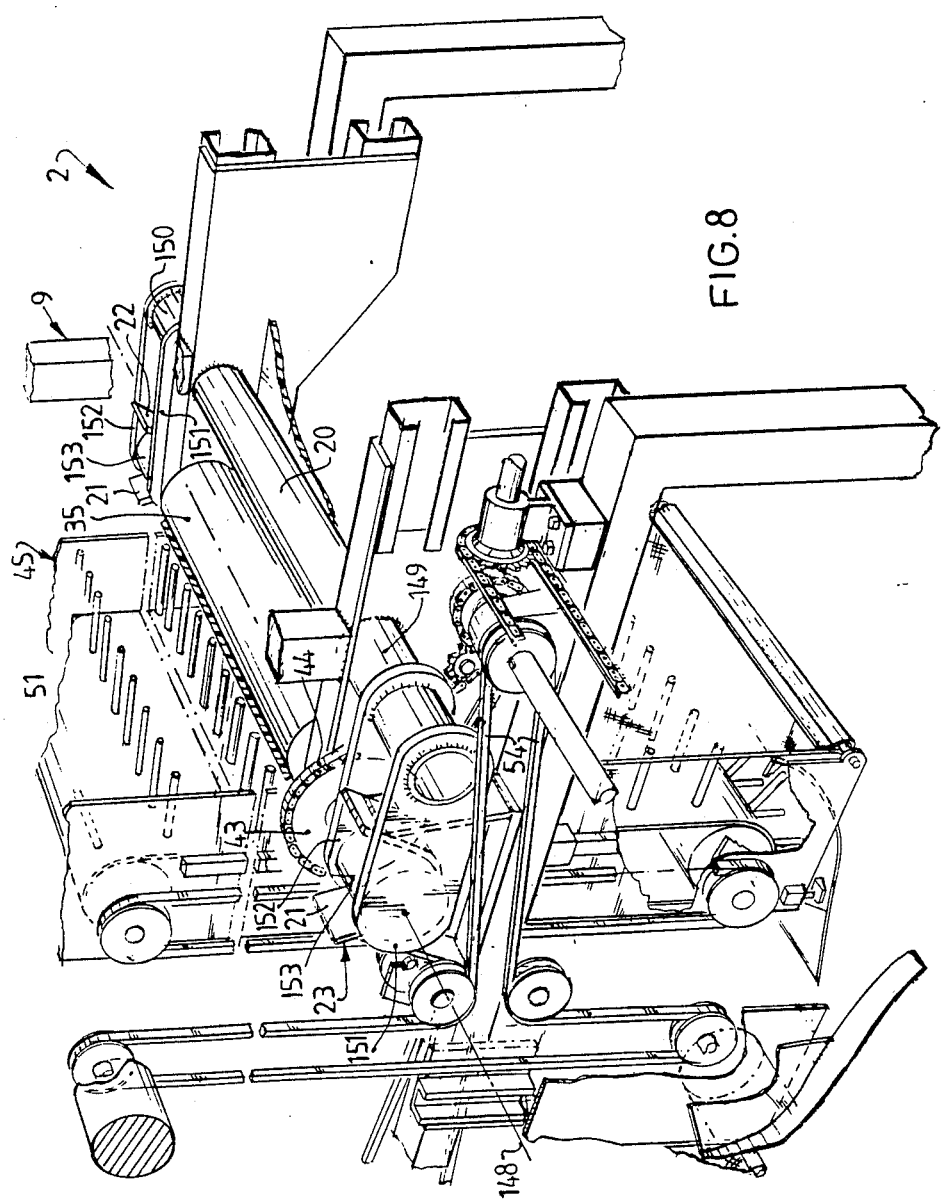
FIG. 8 is a perspective view corresponding to FIG. 1 of another embodiment of the harvesting machine according to the invention.

FIG. 8 shows a second harvesting machine 2 in accordance with the invention. This FIG. 8 corresponds essentially with FIG. 3 of the harvesting machine 1. In this case the tilting supports 22 and 23 comprised in the tilting means are placed as close as possible to the respective holder conveyor 45, and then such that an axis of tilt 148 coincides with an axis of rotation of the roller 35. This is realized in that the tilting tube 20 is elongated at the sides with tube end parts 149 and 150. Welded to these tube end parts are cranks 151, 152 which are parallel to each other and hold between them a crank stub 153 which rests in the seat 21 of the respective tilting supports 22, 23. Thus when the harvesting boom 8, 9 is tilted round the axis of tilt 148 no displacement will take place between roller 35 on the one hand and the respective holder conveyor 45 or 46 on the other. Because in this case the harvesting boom likewise ends before the holder conveyor 45 (at the tube end parts 153) a maximum of space is kept free above holder 5 so that on the one hand conveyor belt 37 can have a maximum width and on the other sufficient space remains free for the reciprocating holder conveyors 45 and 46, their driving means and the driving means for the other conveyors.

Figure 9:
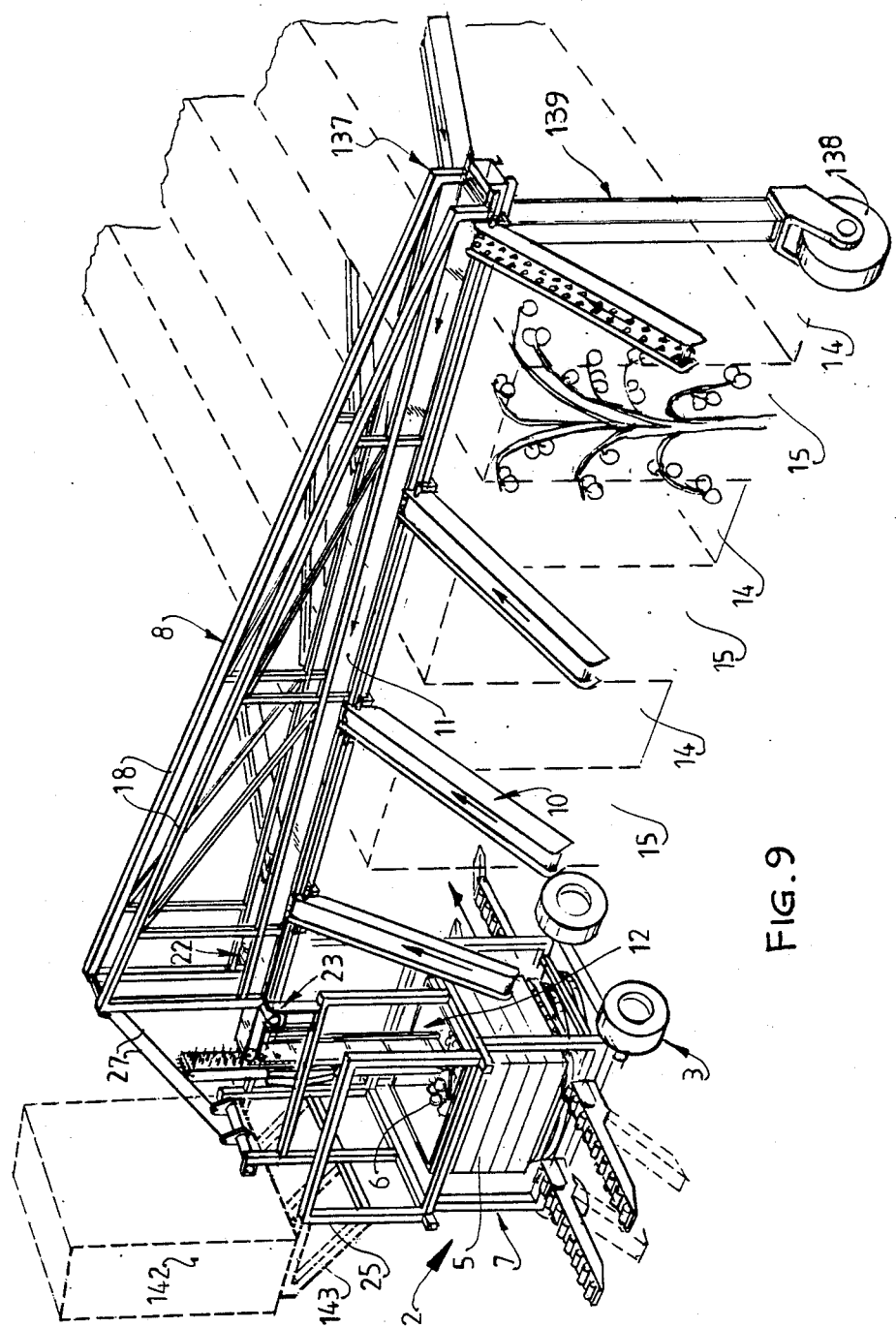
FIG. 9 is a perspective view of a modification of the invention.

Referring now to FIG. 9, a modification is shown wherein there is only one sideways extending harvesting boom. Parts similar to those described previously have been given the same reference characters. The outer free end 137 of the boom is supported by a ground engaging wheel 138 which is connected to the boom by a support 139.

We claim:

1. In a harvesting machine, the combination of a wheeled vehicle adapted to be progressed along a passageway between rows of fruit-bearing crop, the vehicle including a carriage receiving container means for harvested fruit and superstructure defining a vertical passage leading upwardly from the carriage, a boom connected to the superstructure and extending transversely therefrom so that the machine tends to be tipped over due to the weight of the boom, means for counteracting the tendency of the machine to be tipped over by the boom, generally horizontal conveyer means supported on the boom and having a discharge end above the superstructure for discharging harvested fruit into the confines of the vertical passage, holder conveyor means for receiving harvested fruit from the discharge end of the generally horizontal conveyer means and including a vertically disposed conveyer belt for conveying such harvested fruit gently in row-like fashion downwardly through the vertical passage into the container means, and adjusting means for vertically moving the holder conveyer means within the vertical passage along a path closely adjacent the discharge end of the generally horizontal conveyer means in response to accumulation of harvested fruit within the container means, and means for continuously operating said conveyor belt in a downward direction while the holder conveyer means is moved vertically by the adjusting means.

2. In the harvesting machine as defined in claim wherein the holder conveyor means defines a generally rectangular chute and wherein the conveyor belt defines one side of the chute, the opposite side of the chute being defined by the adjusting means.

3. A harvesting machine comprising the combination of a wheeled vehicle adapted to be progressed along a passageway between rows of fruit-bearing crop, the vehicle including a carriage receiving container means for harvested fruit and superstructure defining a vertical passage leading upwardly from the carriage, a pair of booms connected to the superstructure and extending transversely therefrom in substantially opposite directions so that the booms stabilize the machine by counterbalancing of their weights, generally horizontal conveyer means supported on each boom and each having a discharge end above the superstructure for discharging harvested fruit into the confines of the vertical passage, first and second holder conveyor means for receiving harvested fruit from the discharge end of respective ones of the generally horizontal conveyor means and conveying such harvested fruit gently in row-like fashion downwardly through the vertical passage into the container means, each of said holder conveyor means including a vertically disposed conveyer belt having rows of deformable fingers thereon for conveying harvested fruit, and adjusting means for vertically moving each holder conveyor means within the vertical passage along a path closely adjacent the discharge end of its respective generally horizontal conveyer means in response to accumulation of harvested fruit within the container means, and means for operating said conveyor belt in a downward direction while the holder conveyer means is moved upwardly.

4. A harvesting machine comprising the combination of a wheeled vehicle adapted to be progressed along a passageway between rows of fruit-bearing crop, the vehicle including a carriage receiving container means for harvested fruit and superstructure defining a vertical passage leading upwardly from the carriage, a pair of booms connected to the superstructure and extending transversely therefrom in substantially opposite directions so that the booms stabilize the machine by counterbalancing of their weights, generally horizontal conveyer means supported on each boom and each having a discharge end above the superstructure for discharging harvested fruit into the confines of the vertical passage, first and second holder conveyor means for receiving harvested fruit from the discharge end of respective ones of the generally horizontal conveyor means and conveying such harvested fruit gently in row-like fashion downwardly through the vertical passage into the container means, and adjusting means for vertically moving each holder conveyor means within the vertical passage along a path closely adjacent the discharge end of its respective generally horizontal conveyer means in response to accumulation of harvested fruit within the container means, the booms of the pair being laterally offset with respect to each other and the first and second holder conveyer means being disposed in side-by-side relation within the vertical passage.

5. A harvesting means as defined in claim 1 including an outer free end on a boom, and a ground engaging wheel for supporting said outer free end.

6. In a harvesting machine, the combination of a wheeled vehicle adapted to be progressed along a passageway between rows of fruit-bearing crop, a carriage supported by said vehicle for rotation about a vertical axis, said carriage receiving container means for harvested fruit, a superstructure supported by said vehicle and defining a vertical passage extending upwardly from said carriage, a pair of booms connected to said superstructure and extending transversely therefrom in substantially opposite directions so that the boom stabilize the machine by counterbalancing of their weights, conveyer means supported on each boom and each having a discharge end above said passage for discharging harvested fruit into said passage, a pair of holder conveyer means each of which is disposed adjacent the discharge of one of said conveyers for carrying harvested fruit downwardly into container means on said carriage, the holder conveyers being disposed eccentrically with respect to said vertical axis so that fruit is discharged into the container means rapidly and in the correct manner.

7. A harvesting machine as defined in claim 6 including cooperating means on said booms and said superstructure for supporting said booms for tilting movement about an axis with respect to said superstructure.

8. A harvesting machine as defined in claim 7 wherein the discharge ends of said conveyer means extend inwardly of said cooperating means.

9. A harvesting machine as defined in claim 7 wherein each of said conveyer means supported on the booms includes a roller means at the discharge end of the conveyer means, each of said roller means having an axis of rotation which substantially coincides with the axis of tilting movement of the associated booms.

10. A harvesting machine as defined in claim 7 wherein each of said booms is supported for tilting movement at one side of the superstructure, fastening means for each of the booms located at the opposite side of the superstructure with respect to the associated boom, and tensioning means connecting each boom with the associated fastening means.

11. A harvesting machine as defined in claim 10 wherein said fastening means comprises crank means supported for rotation by said superstructure.

12. A harvesting machine as defined in claim 6 wherein said holder conveyer means is supported for vertical reciprocating movement with respect to the superstructure, and cooperating means on the holder conveyor means and the superstructure for guiding vertical movement of the holder conveyor means.

13. A harvesting machine as defined in claim 6 including at least one booster conveyer which is detachably and slidably supported by said booms, and guide means on said boom means for guiding sliding movement of the booster conveyer relative to the associated boom.

14. A harvesting machine as defined in claim 6 wherein each harvesting boom comprises a box frame having a bottom and which supports and guides the associated conveyer means.

15. A harvesting machine as defined in claim 14 wherein the upper part of the box frame is of less width than the lower part thereof, and a booster conveyer supported by a boom, the booster conveyer having an upper discharge end which is disposed above the bottom of the associated box frame.

16. A harvesting machine as defined in claim 6 including a roller conveyer means supported on said carriage, and further roller conveyer means supported on said vehicle and adapted to be aligned with said first mentioned roller conveyer means.

* * * * *